United States Patent
Anderson et al.

(10) Patent No.: US 9,549,539 B2
(45) Date of Patent: Jan. 24, 2017

(54) LOBSTER TRAP STABILIZING SYSTEM

(71) Applicants: Jeffery A. Anderson, Jonesboro, ME (US); Mark Alley, Jonesboro, ME (US)

(72) Inventors: Jeffery A. Anderson, Jonesboro, ME (US); Mark Alley, Jonesboro, ME (US)

( * ) Notice: Subject to any disclaimer, the term of this patent is extended or adjusted under 35 U.S.C. 154(b) by 219 days.

(21) Appl. No.: 14/572,279

(22) Filed: Dec. 16, 2014

(65) Prior Publication Data

US 2016/0165863 A1    Jun. 16, 2016

(51) Int. Cl.
*A01K 69/10* (2006.01)
*A01K 69/08* (2006.01)
*A01K 99/00* (2006.01)

(52) U.S. Cl.
CPC ............... *A01K 69/08* (2013.01); *A01K 69/10* (2013.01); *A01K 99/00* (2013.01)

(58) Field of Classification Search
CPC ........ A01K 69/08; A01K 69/10; A01K 69/06; A01K 69/00; A01K 75/06
See application file for complete search history.

(56) References Cited

U.S. PATENT DOCUMENTS

| | | | | |
|---|---|---|---|---|
| 498,082 A * | 5/1893 | Pigott | ..................... | B63B 41/00 114/126 |
| 3,003,278 A * | 10/1961 | Armentrout | ........... | A01K 69/06 43/103 |
| 3,708,905 A * | 1/1973 | Jalbert | ................... | A01K 69/08 43/100 |
| 3,852,908 A * | 12/1974 | Christopher | ........... | A01K 63/00 43/102 |
| 3,992,804 A * | 11/1976 | Senese | .................... | A01K 69/08 43/100 |
| 4,221,071 A * | 9/1980 | Sjolund | .................. | A01K 69/08 43/100 |
| 4,262,379 A * | 4/1981 | Jankiewicz | ............. | A01K 69/08 102/406 |
| 5,187,893 A | 2/1993 | Knight | | |
| 5,839,220 A * | 11/1998 | Wass | ...................... | A01K 69/10 43/100 |
| 5,924,237 A * | 7/1999 | Ives | ....................... | A01K 69/10 43/100 |
| 5,926,998 A | 7/1999 | Nelson | | |
| 5,974,725 A | 11/1999 | Knight | | |
| 7,111,427 B1 * | 9/2006 | Gaughen | ................ | A01K 69/06 43/100 |
| D551,735 S * | 9/2007 | Bartlett | ........................ | D22/121 |
| 7,434,527 B2 * | 10/2008 | Brighi | ..................... | B63B 39/06 114/126 |
| 7,533,486 B2 * | 5/2009 | Ribeiro De Matos | . | A01K 69/10 43/100 |
| 7,874,097 B2 | 1/2011 | Goodwin, III | | |
| 8,793,929 B1 * | 8/2014 | Walsh | ................. | A01M 25/004 43/131 |
| 2007/0251138 A1 * | 11/2007 | Ribeiro De Matos | . | A01K 69/10 43/100 |

* cited by examiner

*Primary Examiner* — Kristen C Hayes
(74) *Attorney, Agent, or Firm* — Anthony D. Pellegrini (57) ABSTRACT

A lobster trap stabilization system having one or more hinged fins, each fin enclosed in a containment structure located in a lobster trap opposite the weighted side of the trap, whereby the fins provide increased drag to a trap descending to the ocean floor while the trap is in an improper orientation relative to the ocean floor, thus facilitating trap rotation to achieve proper trap orientation, and provide little to no drag to a descending trap while it is in its proper orientation.

20 Claims, 7 Drawing Sheets

LOBSTER TRAP STABILIZING SYSTEM

BACKGROUND OF THE INVENTION

1. Technical Field

The present invention relates generally to lobster traps and more specifically relates to a system for stabilizing a lobster trap during its descent to the ocean floor.

Lobster traps used for catching Atlantic lobsters (*Homarus americanus*) have evolved from the quaint, rounded topped wooden devices so often pictured on postcards to the substantially rectangular, utilitarian plastic coated wire devices almost universally used today. These traps, or "pots", usually have two funneled openings called "heads", one located on each side of the trap, each opposite the other, through which lobsters enter. Inside the trap there is a first compartment commonly called the "kitchen", in which a baited bag is placed, and a second compartment, commonly called the "parlor", which is separated from the kitchen and accessed by an internal head and into which lobsters may venture. The funnel design of the heads are intended to make movement through the heads in one direction easier than in the other direction, such that lobsters eventually congregate in the parlor. However, it has been shown that notwithstanding this feature, lobsters frequently exit traps.

Figure 1:
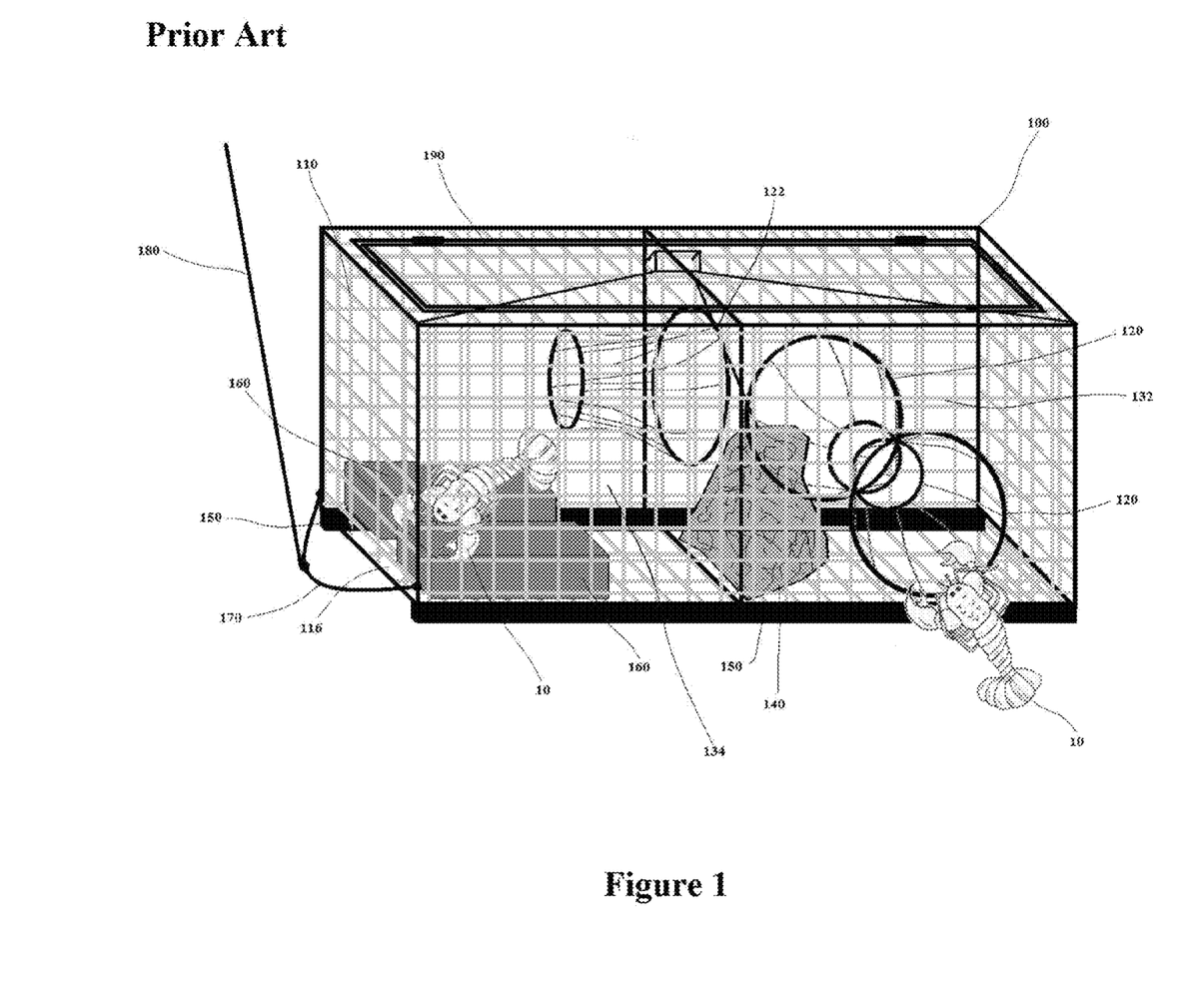
FIG. 1 depicts a perspective view of a traditional plastic coated wire mesh lobster trap, with one lobster already in the parlor and another lobster about to enter through one head.

At one end of a lobster trap is a bridle, and attached to the bridle is a rope. The rope may be a top line, which has a floating buoy attached to its end opposite the end attached to the bridle, with the buoy providing a visual indication of where the trap is located and a means for retrieving the trap. Alternatively, the rope may be a trawl line, which attaches two or more traps together. A trawl of traps will have at least one top line, at one end of the trawl, and often two top lines, one at each end of the trawl. Traps typically have a pair of parallel runners located along their outside bottom sides, to protect the trap and to allow for easier movement over rocky ocean floor. They also typically have one or more weights attached to the inside bottom of the trap. The weights counter any natural buoyancy of the trap and its gear and facilitate the trap's sinking to the ocean floor. See FIG. 1.

Figures 2A, 2C:
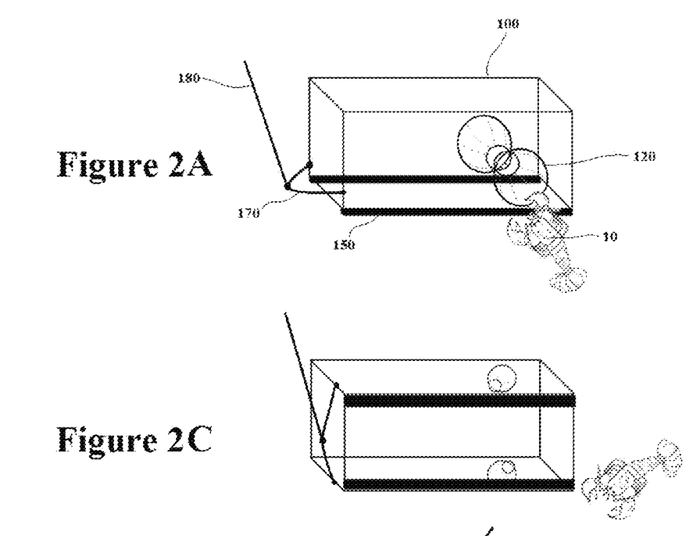
FIG. 2A depicts a perspective schematic view of a lobster trap in its proper orientation on the ocean floor.
FIG. 2C depicts a perspective schematic view of a lobster trap in a second improper orientation, whereby the trap lies on its side on the ocean floor.
Figures 2B, 2D:
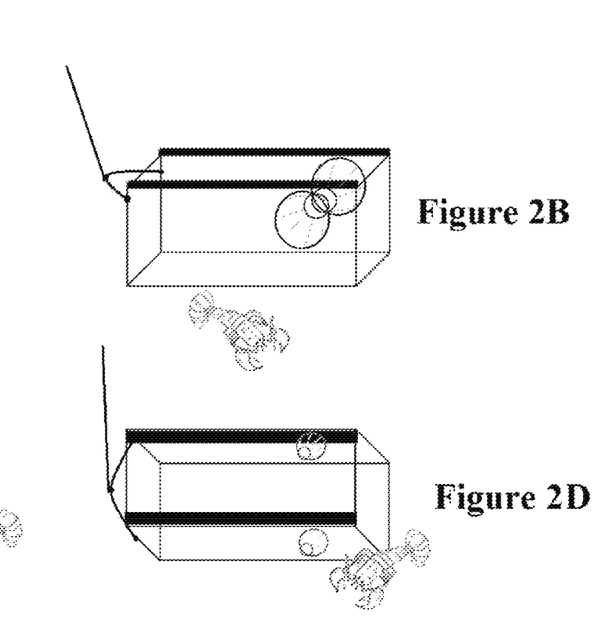
FIG. 2B depicts a perspective schematic view of a lobster trap in a first improper orientation, whereby the trap lies upside down on the ocean floor.
FIG. 2D depicts a perspective schematic view of a lobster trap in the second improper orientation, whereby the trap lies on its other side on the ocean floor.
Figure 2E:
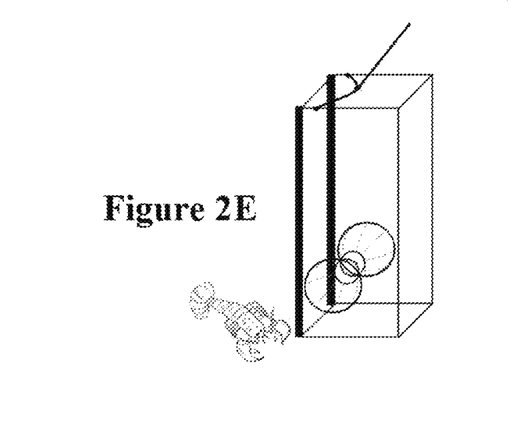
FIG. 2E depicts a perspective schematic view of a lobster trap in a third improper orientation, whereby the trap lies on its stern end on the ocean floor.
Figure 2F:
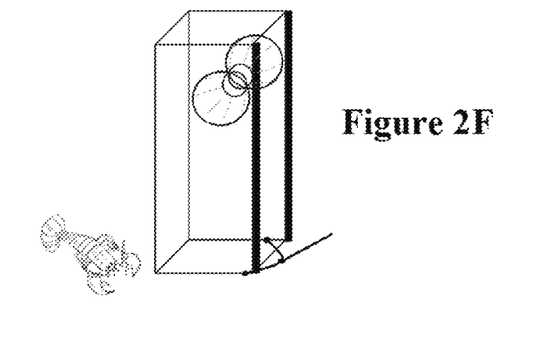
FIG. 2F depicts a perspective schematic view of a lobster trap in a fourth improper orientation, whereby the trap lies on its bridle end on the ocean floor.

Lobsters tend to walk into a lobster trap, rather than swim into it. Thus, the side heads are located near the bottom of the trap, so that a lobster walking along the ocean floor can easily step into a head when the trap is resting on the ocean floor in its proper, right side up orientation. See FIG. 2A. However, when traps are being set, they may be tossed off a lobster boat in various orientations, e.g., sideways, end first, or even upside down. When a trawl is set, the traps typically are tossed off the stern of the lobster boat, and the propeller wash may cause them to rotate. A multi-trap trawl also may be launched off a trawl table or over the side of a boat, and as the traps are played out one by one they may rotate to a undesirable orientation due to sea conditions, flow of the tide, currents, or tangling or becoming impaired with rope, traps, or other common items found on the deck of a fishing vessel. Even a trap properly oriented when tossed off a lobster boat may rotate during its descent, due to currents, ropes becoming tangled, or other reasons. As a consequence, a significant percentage of traps arrive on the ocean floor in improper orientations: on their sides, see FIGS. 2C and 2D, on their ends, see FIGS. 2E and 2F, or upside down, see FIG. 2B. This reduces the effectiveness of lobstering, because in every improper orientation the heads of the traps are positioned higher off the ocean floor than is desired, making it more difficult for lobsters to walk into the trap. For example, when the trap is oriented upside down, the heads of the trap are substantially higher off the ocean floor than when the trap is in its proper orientation, thus making access for the lobster more difficult. See FIG. 2B. When the trap is oriented on its side, one of the heads (the downwardly oriented one) is completed blocked and the other head is oriented upward, making it extremely difficult for a lobster to walk into it from the ocean floor. See FIGS. 2C and 2D. Thus, the likelihood of capturing a lobster in an improperly oriented trap is lower than for a properly oriented trap, and even when an improperly oriented trap does capture a lobster, the total number of lobsters captured is likely to be less than from a properly oriented trap. Yet it takes just as much fishing effort to prepare, set, and retrieve a trap that ends up being improperly oriented as it does for a trap that ends up being properly oriented. If an effective system can be deployed to minimize improperly oriented lobster traps, the lobster fisherman will experience greater catch volumes for the same amount of fishing effort.

There is thus demonstrated a need for a system which helps stabilize a lobster trap during its descent to the ocean floor and reorients an improperly oriented trap during its descent, thereby improving the likelihood that the trap will rest on the ocean floor in its proper orientation.

It is therefore an object of the present invention to provide a lobster trap stabilization system.

It is another object of the present invention to provide a lobster trap stabilization system which maintains a properly oriented lobster trap in its proper orientation during its descent to the ocean floor.

It is yet another object of the present invention to provide a lobster trap stabilization system which reorients an improperly oriented lobster trap to its proper orientation during its descent to the ocean floor.

It is yet another object of the present invention to provide a lobster trap stabilization system which does not interfere with the ingress or egress of lobsters into and out of lobster traps.

It is yet another object of the present invention to provide a lobster trap stabilization system which conforms to state lobstering regulations.

It is yet another object of the present invention to provide a lobster trap stabilization system which does not interfere with the hauling of lobster traps to the surface.

It is yet another object of the present invention to provide a lobster trap stabilization system which may be used to retrofit a lobster trap.

It is yet another object of the present invention to provide a lobster trap stabilization system which may include one or more individual components to be placed into a lobster trap.

It is yet another object of the present invention to provide a lobster trap stabilization system which is easy and inexpensive to manufacture.

Other objects and advantages of the present invention will become obvious to the reader and it is intended that these objects and advantages are within the scope of the present invention. To the accomplishment of the above and related objects, this invention may be embodied in the form illustrated in the accompanying drawings. Attention is called to the fact, however, that the drawings are illustrative only, and that changes may be made in the specific construction illustrated and described within the scope of this disclosure.

SUMMARY OF THE INVENTION

Figure 3:
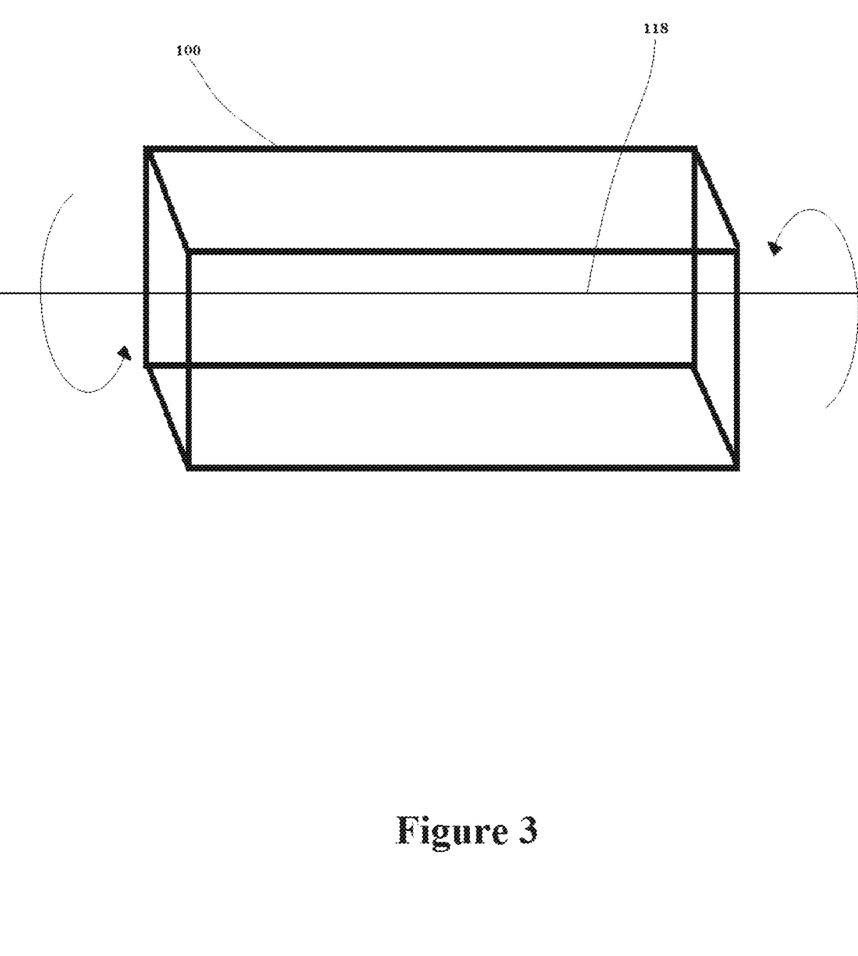
FIG. 3 depicts a perspective schematic view of the rotational motion of a lobster trap about its longitudinal axis.

The present invention works by facilitating the rotation of a lobster trap about its longitudinal axis. See FIG. 3. This is accomplished by creating hydrodynamic drag in the trap by adding one or more hinged fins to a trap opposite the weighted side of the trap, whereby the fins provide increased drag to a descending trap while it is in an improper orientation, facilitating trap rotation, and provide little to no drag to a descending trap while it is in its proper orientation.

Figure 4A:
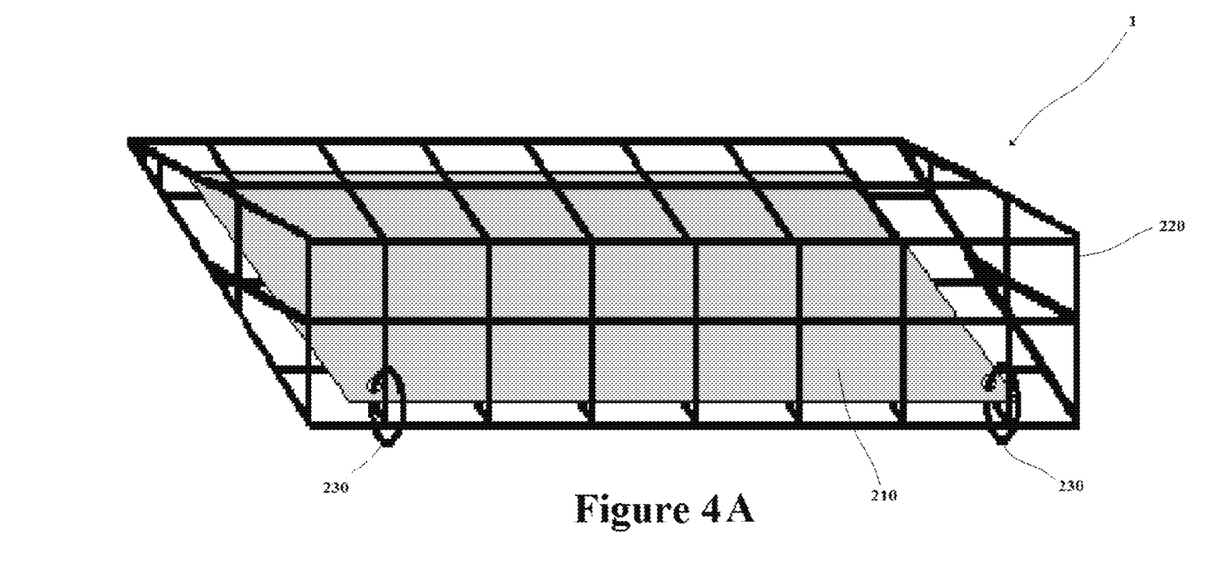
FIG. 4A depicts a perspective view of one embodiment of the stabilizing component of the present invention.
Figure 5A:
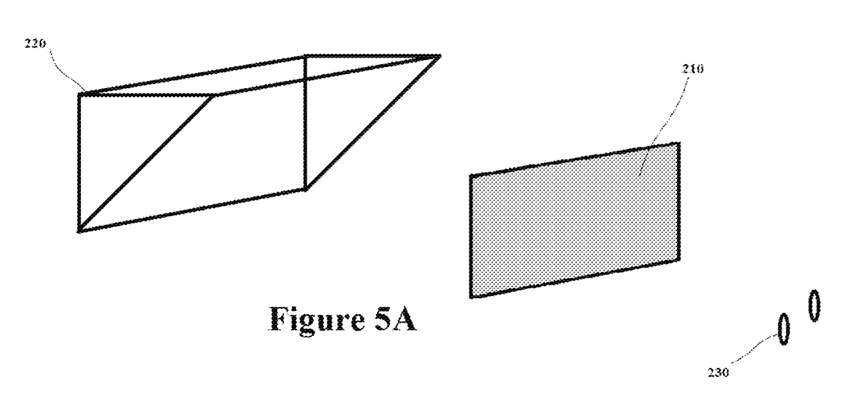
FIG. 5A depicts a perspective exploded schematic view of the components of the stabilizing component of the present invention.
Figures 5B, 5C, 5D:
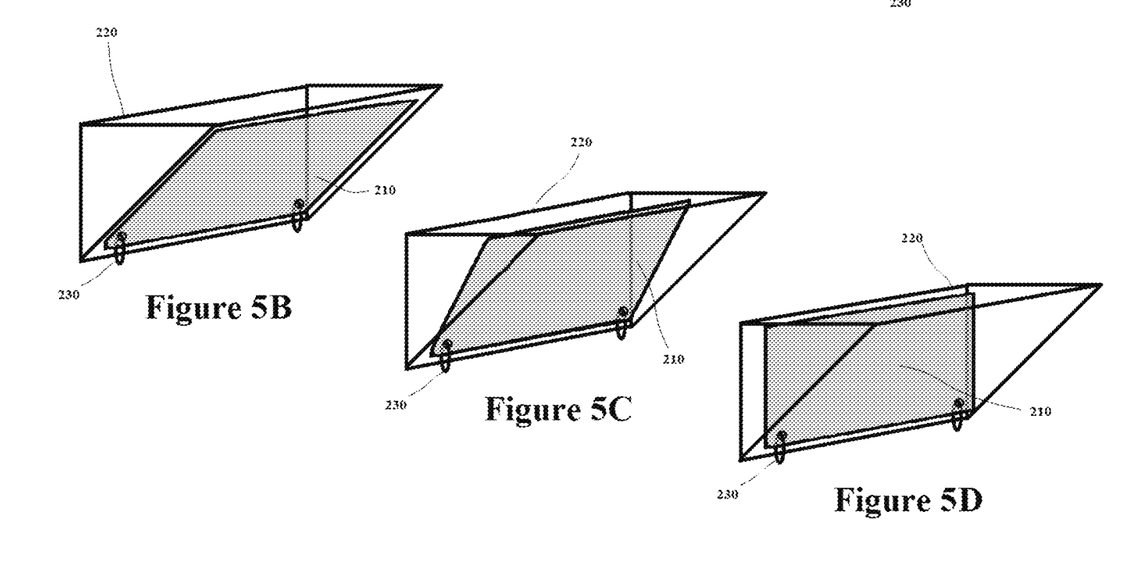
FIG. 5B depicts a perspective schematic view of the stabilizing component of the present invention with the fin in its highest position.
FIG. 5C depicts a perspective schematic view of the stabilizing component of the present invention with the fin in an intermediate position.
FIG. 5D depicts a perspective schematic view of the stabilizing component of the present invention with the fin in its lowest position.
Figure 6:
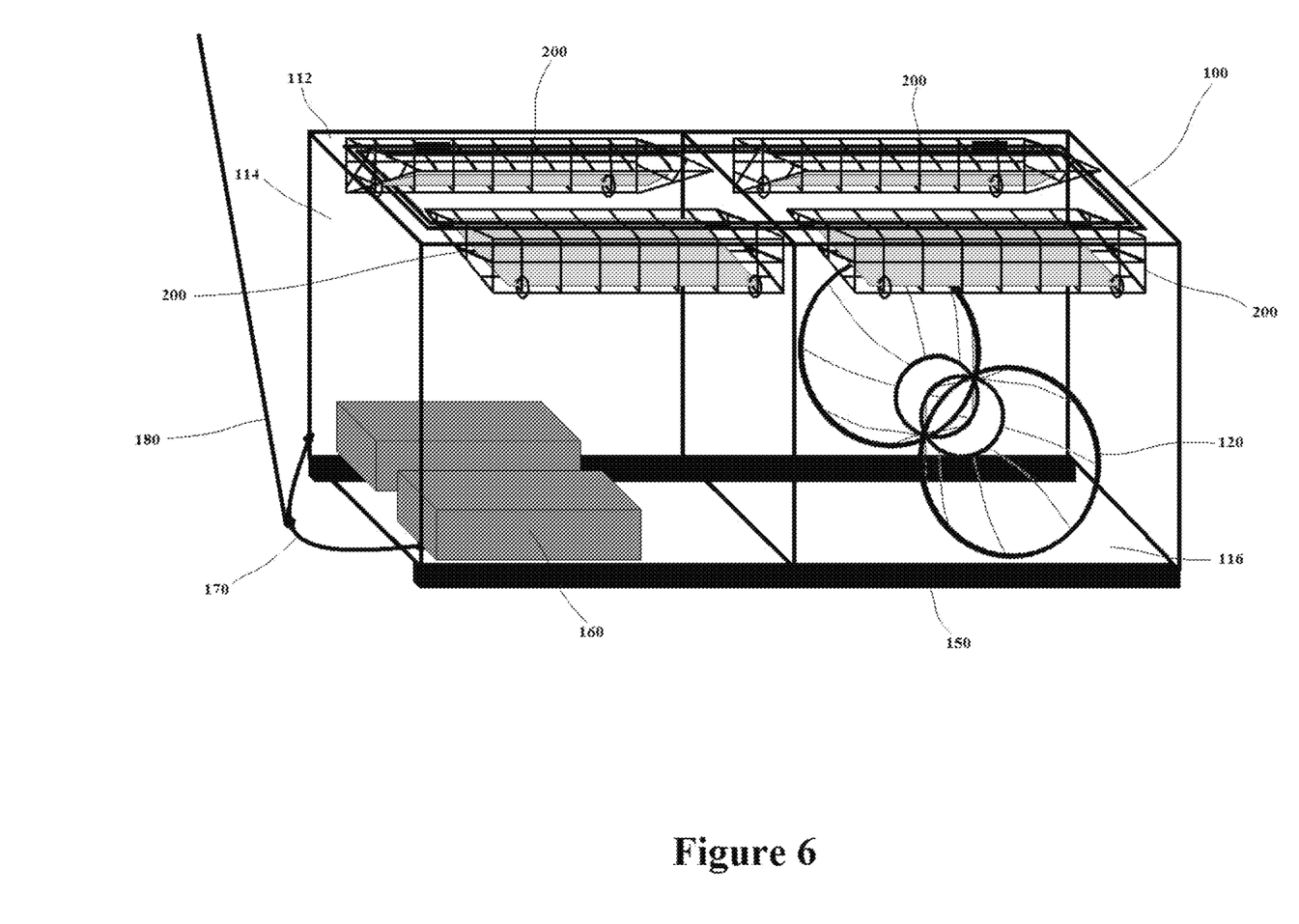
FIG. 6 depicts a perspective view of a traditional plastic coated wire mesh lobster trap with four stabilizing components of the present invention installed (for clarity, certain components of the lobster trap are not shown, including the wire mesh external walls).

In one embodiment, the lobster trap stabilization system is comprised of one or more stabilizing component devices, with each stabilizing component device having a hinged fin placed within an elongate hollow containment structure. The hinged fin is preferably substantially rectangular. The containment structure has a triangular cross section with one 90 degree angle and two acute angles (preferably 45 degrees each). See FIG. 5A. The containment structure also must be porous, to allow water to pass into and through it. See FIG. 4A. The hinged fin is enclosed within the containment structure and is hinged at its bottom edge to the bottom of the containment structure. See FIGS. 5B-5D. The containment structure is placed inside a lobster trap with its 90 degree angle oriented upwards and its top side aligned with the top of the lobster trap and its lateral side aligned with a side of the lobster trap. See FIG. 6.

Figure 4B:
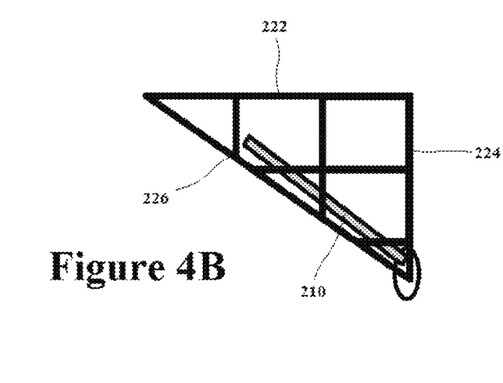
FIG. 4B depicts a plan side view of the embodiment of the stabilizing component of the present invention shown in FIG. 4A with the fin in its lowest position.
Figure 4C:
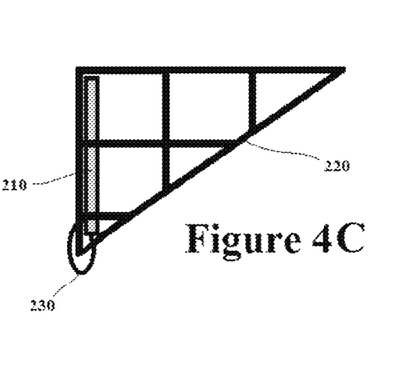
FIG. 4C depicts a plan side view of the embodiment of the stabilizing component of the present invention shown in FIG. 4A with the fin in its highest position.

So configured, the fin moves between a highest position and a lowest position, achieving intermediate positions between the highest and lowest positions. In the highest position, the fin is positioned against the lateral side wall of the containment structure. See FIGS. 4C and 5D. In the lowest position, the fin is positioned against the slanted wall of the containment structure. See FIGS. 4B and 5B. In the intermediate positions, the fin is positioned such that it does not lie against either the lateral side wall or the slanted wall of the containment structure. See FIG. 5C.

When a descending lobster trap is properly oriented, the hinged fin is situated in its highest position and is oriented substantially vertically. As such, it provides very little drag as the trap descends through the water. The trap continues to descend and the lobster trap stabilization system does not cause rotation. When a lobster trap is descending in an improper orientation, however, the hinged fin moves between its highest, intermediate, and lowest positions. In such cases, the fin creates some amount of additional drag on one side of the trap which tends to unbalance the trap and initiate or perpetuate rotation of the trap. Thus there exists a bias against the trap being in an improper orientation and a bias towards the trap being properly oriented. Any external forces attempting to (re)position the trap in an improper orientation will therefore be negated by the inherent bias of the trap to remain in or return to a proper orientation as created by the present invention.

For purposes of illustration, as shown in FIGS. 7A through 7E, a lobster trap may have a pair of component devices. In this example, the trap initially descends in an upside down orientation. The bottom weights are oriented upwards, the two component devices are oriented downwards, and the two fins are in their lowest positions, creating partial horizontal drag. See FIG. 7A. The trap is unbalanced in this orientation, with the weighted side disposed to descend faster than the finned side. The trap thus begins to tip to one side (in this example, in a clockwise direction). As the trap rotates, the upper fin moves to an intermediate position, providing limited drag, while the lower fin remains in its lowest position, providing partial horizontal drag. See FIG. 7B. The weighted side of the trap continues to be disposed to descend faster than the side subject to drag, and rotation of the trap continues in a clockwise direction. By the time the trap rotates to a sideways orientation, the upper fin has moved to its highest position, providing maximum horizontal drag, while the lower fin remains in its lowest position, providing partial horizontal drag. See FIG. 7C. This disposes the weighted side of the trap to descend more quickly than the finned side of the trap, accelerating the trap's rotation. As the trap continues to rotate, the upper fin moves to its highest position, providing less drag, while the lower fin moves to an intermediate position, also providing less drag. See FIG. 7D. Rotation of the trap continues but is slowed. Finally, the trap achieves its proper orientation and the fins, both in their highest positions, provide minimal drag. See FIG. 7E. The trap no longer has a tendency to rotate and continues its descent in the proper orientation.

Figures 7A, 7B:
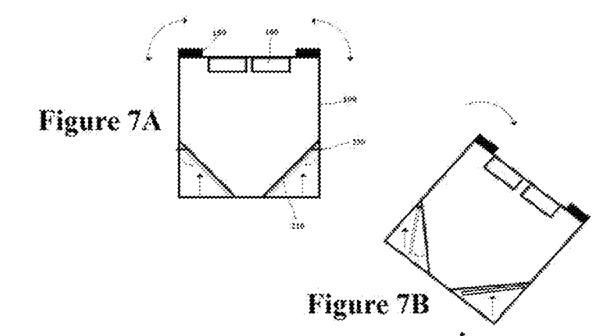
FIG. 7A depicts a plan side view of a lobster trap in the first improper orientation (upside down); the fins of the stabilizing components are in their lowest positions, thereby creating maximum drag and destabilizing the trap, causing the trap to tip.
FIG. 7B depicts a plan side view of the lobster trap shown in FIG. 7A beginning to rotate; the fins of the upward oriented stabilizing components have pivoted to intermediate positions while the fins of the downward oriented stabilizing components remain in their lowest positions.
Figure 7C:
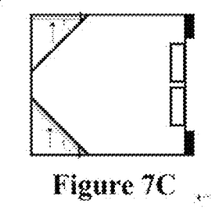
FIG. 7C depicts a plan side view of the lobster trap shown in FIG. 7A in the second improper orientation (sideways); the fins of the upward oriented stabilizing components have pivoted to their highest positions while the fins of the downward oriented stabilizing components remain in their lowest positions, thereby creating maximum drag on the "top" side of the trap, continuing the rotation of the trap.
Figure 7D:
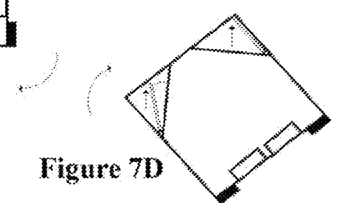
FIG. 7D depicts a plan side view of the lobster trap shown in FIG. 7A as it continues to rotate; the fins of the upward oriented stabilizing components have pivoted to their highest positions while the fins of the downward oriented stabilizing components have pivoted to intermediate positions.
Figure 7E:
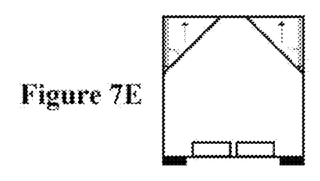
FIG. 7E depicts a plan side view of the lobster trap shown in FIG. 7A in the proper orientation; the fins of all the stabilizing components have pivoted to their highest positions, thereby minimizing drag and causing the trap to cease rotating.

Notwithstanding the foregoing example, a trap may begin its descent in any orientation, such as that shown in FIG. 7B, or FIG. 7C, or FIG. 7D. Additionally, though the example shows the trap rotating in a clockwise direction, it also may rotate in a counter-clockwise direction, with FIGS. 7B, 7C, and 7D reversed. An initially properly oriented trap may become improperly oriented during its descent, due to currents or other causes, thereby moving from the orientation shown in FIG. 7E to an improper orientation, but the action of the fins creating drag as described above will cause the trap to return to its correct orientation.

When a lobster trap is hauled up from the ocean floor, the rope pulls upward on the bridle and the trap is oriented substantially on end, bridle end up. See FIG. 2E. In this orientation, the fin of the lobster trap stabilization system moves through the water substantially edge on, thus providing little to no drag and requiring no additional effort to haul the trap than if the system were not being used.

DETAILED DESCRIPTION OF THE PRESENT INVENTION

The lobster trap stabilization system 1 of the present invention is intended to be used with a wire lobster trap 100. A wire lobster trap 100 is formed of substantially planar walls of plastic coated wire mesh panels 110, forming a substantially rectangular cube. See FIG. 1. The top 112 of the trap 100 has a hinged door 190, each lateral side 114 of the trap contains an access point 120 called a "head", permitting access into the trap's 100 interior by lobsters 10. The bottom 116 of the trap 100 is fitted with a pair of parallel runners 150 on the underside of the trap 100 to offer protection and to facilitate the movement of the trap 100 across the rocky ocean floor. Attached to the bottom 116 of the trap 100 in the interior of the trap 100 are one or more weights 160, which facilitate the trap 100 sinking to the ocean floor. The interior of the trap 100 is divided into two compartments; the first, which contains the pair of heads 120, is called the kitchen 132, and the second is called the parlor 134. The kitchen 132 is separated from the parlor 134 by a dividing wall made of plastic coated wire 110, oriented substantially perpendicular to the longitudinal axis 118 of the trap 100. A bait bag 140 is placed within the kitchen 132 to attract lobsters 10 into the trap 100. There is an internal head 122 formed into the dividing wall, allowing passage from the kitchen 132 into the parlor 134. Each of the access heads 120 and the internal head 122 are substantially circular and have a conical netting structure, such that the widest portion of the cone is at the entrance of the head 120,122 and the narrowest portion of the cone is at the exit point. This encourages one-way movement of lobsters 10 through the heads 120,122 into the trap 100 and eventually into the parlor 134. Finishing off the configuration of the trap is a bridle 170 attached to one end of the trap 100 and a rope 180 attached to the bridle 170, with the rope 180 used to link traps 100 together or to link one or more traps 100 to a floating buoy.

The lobster trap stabilization system 1 of the present invention comprises one or more stabilizing components 200. Each of the stabilizing components 200 is comprised of a fin 210, a containment structure 220, and a hinge means 230. See FIG. 5A. The containment structure 220 has a hollow interior and is suitably configured to contain the fin 210. The hinge means 230 may have any suitable configuration, provided it attaches the fin 210 to the containment structure 220 so that the fin 210 may freely move about within the containment structure 220. The fin 210 must be substantially planar and substantially rigid. It can have any suitable shape that allows it to move within the containment structure 220. This shape may be substantially square, or oblong, or a parallelogram. In the preferred embodiment the fin 210 is substantially rectangular, having a length just slightly shorter than the length of the containment structure 220. The fin 210 may be made of any suitable material, including metal, alloys, or wood. In the preferred embodiment the fin 210 is made of plastic. A plastic fin 210 is less likely to corrode over time, is light weight and inexpensive, and minimizes "clanking" noises when moving within the containment structure 220. Moreover, depending on the type of plastic used, the fin 210 may have positive or negative buoyancy.

The containment structure 220 can have any suitable shape as long as it contains the fin 210 within its hollow interior and the fin 210 can move about therein. Thus, it may be cylindrical, or an elongate four sided structure, or a six sided structure, or the like. In the preferred embodiment the containment structure 220 is an elongate three sided structure having substantially rectangular planar side walls, a triangular cross section, and a plurality of apertures in the side walls to allow water to flow through the containment structure 220. See FIG. 4A. Each of the side walls may be made of any suitable material, such as plastic, wood, stainless steel, uncoated wire mesh, and the like. In the preferred embodiment the side walls are constructed of plastic coated galvanized wire 110, the same material used to fabricate the lobster trap 100. In the most preferred embodiment of the containment structure 220 the three side walls are designated a top wall 222, a lateral side wall 224, and a slanted wall 226. Each of the top wall 222, lateral side wall 224, and slanted wall 226 has a width and a length and a first long edge and a second long edge, with the lengths of each of the top wall 222, lateral side wall 224, and slanted wall 226 substantially the same. The first long edge of the top wall 222 is aligned with and in connection with the second long edge of the lateral side wall 224, such that the top wall 222 and the lateral side wall 224 are in fixed relation to each other in a substantially perpendicular orientation to each other. The second long edge of the top wall 222 is aligned with and in connection with the first long edge of the slanted wall 226, such that the top wall 222 and the slanted side wall 226 are in fixed relation to each other and oriented at an acute angle to each other. In the most preferred embodiment this angle measures forty-five degrees. Finally, the first long edge of the lateral side wall 224 is aligned with and in connection with the second long edge of the slanted wall 226, such that the lateral side wall 224 and the slanted side wall 226 are in fixed relation to each other and oriented at an acute angle to each other. In the most preferred embodiment this angle measures forty-five degrees.

The hinge means 230 must be suitably configured to hingedly attach the fin 210 to the containment structure 220 so that the fin 210 may freely move within the containment structure 220. See FIGS. 5B, 5C, and 5D. The hinge means 230 therefore may include a plurality of rings, looped pieces of wire, plastic cable ties, standard door hinges, and the like. In the preferred embodiment the hinge means 230 comprises two or more hog rings, which are metal rings traditionally used in lobster trap 100 construction. The fin 210 has a corresponding number of apertures arrayed along one edge, with each aperture suitable to accommodate one ring therethrough. The rings also pass through one or more of the apertures of the containment structure 220. In the most preferred embodiment the hinge means 230 attaches the fin 210 to the containment structure 220 at a location proximate to where the lateral side wall 224 meets the slanted wall 226. See FIGS. 4A, 4B, and 4C.

Each stabilizing component 200 is placed within the interior of the trap 100. It could be placed anywhere within the interior of the trap 100, but in the preferred embodiment it is placed alongside a lateral wall 114 of the trap 100 proximate to the top 112 of the trap 100. See FIG. 6. This placement of the stabilizing components 200 keeps them out of the way of the heads 120,122 and off the bottom 116 of the trap 100 so as not to interfere with the ingress of lobsters 10. The stabilizing component 200 is attached to the trap 100 by any suitable means. In the preferred embodiment each of the one or more stabilizing components 200 is attached to the trap 100 by aluminum clips. In one embodiment only a single stabilizing component 200 may be used. In another embodiment a pair of stabilizing components 200 is used, one on each side of the trap 100. Or both stabilizing components 200 may be placed on the same side of the trap 100. One may be placed in the kitchen 132 and one in the parlor 134, or both could be placed in the kitchen 132 or both in the parlor 134. In the most preferred embodiment, four stabilizing components 200 are used, two on each side of the trap 100, with a pair in the kitchen 132 and a pair in the parlor 134. See FIG. 6.

In an alternative embodiment of the present invention, the containment structure 220 of each of the one or more stabilizing components 200 is formed of a slanted wall 226, with the slanted wall 226 having a substantially rectangular shape and a first long edge and a second long edge. The remainder of the containment structure 220 is formed of a portion of the top side 112 of the trap 100 and a portion of a lateral side 114 of the trap 100, thereby resulting in a containment structure 220 having a triangular cross section. The first long edge of the slanted wall 226 is in connection with the portion of the top side 112 of the trap 100, whereby the slanted wall 226 and the portion of the top side 112 of the trap 100 are oriented at an acute angle to each other. The second long edge of the slanted wall 226 is in connection with the portion of the lateral side 114 of the trap 100, whereby the slanted wall 226 and the portion of the lateral side 114 of the trap 100 are oriented at an acute angle to each other. The fin 210 is placed within the interior of the containment structure 220, and the hinge means 230 attaches the fin 210 at a location proximate to the junction of the slanted wall 226 and the portion of the lateral side 114 of the trap 100. In a preferred embodiment of this configuration, the slanted wall 226 of the containment structure 220 is constructed of plastic coated wire 110. The slanted wall 226 of the containment structure 220 may be attached to the trap 100 by aluminum clips. This variant of the present invention is simpler to manufacture but does not give the lobster trap 100 the same degree of rigidity and structural integrity as a stabilizing component 200 constructed of three separate side walls 222,224,226, as described above.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

We claim:

1. A lobster trap stabilization system for use with a wire lobster trap, said system comprising
   one or more stabilizing components, with each said stabilizing component comprising
      a fin, said fin being substantially planar and substantially rigid,
      a containment structure, said containment structure having a hollow interior and being suitably configured to contain the fin within said hollow interior, and
      a hinge means, said hinge means suitably configured to hingedly attach the fin to the containment structure so that the fin may freely move within the containment structure;
   whereby when the one or more stabilizing components are placed within an interior of the lobster trap the lobster trap would be stabilized during its descent to the ocean floor.

2. The lobster trap stabilization system of claim 1 wherein for each of the one or more stabilizing components
   the fin is substantially rectangular, and
   the containment structure is elongate, has three substantially planar side walls, has a triangular cross section, and has a plurality of apertures in said side walls to allow water to flow through the containment structure.

3. The lobster trap stabilization system of claim 2 wherein for each of the one or more stabilizing components the containment structure comprises
   a top wall,
   a lateral side wall, and
   a slanted wall,
   wherein each of the top wall, lateral side wall, and slanted wall is substantially rectangular and has a width and a length and a first long edge and a second long edge, with the lengths of each of the top wall, lateral side wall, and slanted wall substantially the same,
   with the first long edge of the top wall aligned with and in connection with the second long edge of the lateral side wall, whereby the top wall and the lateral side wall are substantially perpendicular to each other,
   with the second long edge of the top wall aligned with and in connection with the first long edge of the slanted wall, whereby the top wall and the slanted side wall are oriented at an acute angle to each other, and with the first long edge of the lateral side wall aligned with and in connection with the second long edge of the slanted wall, whereby the lateral side wall and the slanted side wall are oriented at an acute angle to each other.

4. The lobster trap stabilization system of claim 3 wherein for each of the one or more stabilizing components the containment structure is constructed of plastic coated wire.

5. The lobster trap stabilization system of claim 3 wherein for each of the one or more stabilizing components the fin is hingedly attached to the containment structure by the hinge means at a location proximate to where the lateral side wall is in connection with the slanted wall.

6. The lobster trap stabilization system of claim 4 wherein for each of the one or more stabilizing components the hinge means is comprised of two or more rings passing through a corresponding number of apertures formed in the fin and engaged with the wire of the containment structure.

7. The lobster trap stabilization system of claim 4 wherein for each of the one or more stabilizing components the fin is hingedly attached to the containment structure by the hinge means at a location proximate to where the lateral side wall is in connection with the slanted wall.

8. The lobster trap stabilization system of claim 7 wherein for each of the one or more stabilizing components the hinge means is comprised of two or more rings passing through a corresponding number of apertures formed in the fin and engaged with the wire of the containment structure.

9. The lobster trap stabilization system of claim 3 wherein for each of the one or more stabilizing components the top wall of the containment structure is placed against and attached to a top side of the lobster trap and the lateral side wall of the containment structure is placed against and attached to a lateral side of the lobster trap.

10. The lobster trap stabilization system of claim 1 comprising four stabilizing components.

11. The lobster trap stabilization system of claim 10 wherein for each of the four stabilizing components said stabilizing component is placed against and attached to a top side of the lobster trap and the lateral side wall of the containment structure is placed against and attached to a lateral side of the lobster trap.

12. The lobster trap stabilization system of claim 1 wherein for each of the one or more stabilizing components the containment structure is formed of a slanted wall, said slanted wall having a substantially rectangular shape and a first long edge and a second long edge, and a portion of a top side of the lobster trap and a portion of a lateral side of the lobster trap, with the first long edge of the slanted wall in connection with the portion of the top side of the lobster trap, whereby the slanted wall and the portion of the top side of the lobster trap are oriented at an acute angle to each other, and with the second long edge of the slanted wall in connection with the portion of the lateral side of the lobster trap, whereby the slanted wall and the portion of the lateral side of the lobster trap are oriented at an acute angle to each other.

13. The lobster trap stabilization system of claim 12 wherein for each of the one or more stabilizing components the slanted wall of the containment structure is constructed of plastic coated wire.

14. The lobster trap stabilization system of claim 12 wherein for each of the one or more stabilizing components the fin is hingedly attached to the containment structure by the hinge means at a location proximate to where the lateral wall of the lobster trap is in connection with the slanted wall.

15. The lobster trap stabilization system of claim 13 wherein for each of the one or more stabilizing components the hinge means is comprised of two or more rings passing through a corresponding number of apertures formed in the fin and engaged with the wire of the containment structure.

16. The lobster trap stabilization system of claim 13 wherein for each of the one or more stabilizing components the fin is hingedly attached to the containment structure by the hinge means at a location proximate to where the lateral wall of the lobster trap is in connection with the slanted wall.

17. The lobster trap stabilization system of claim 16 wherein for each of the one or more stabilizing components the hinge means is comprised of two or more rings passing through a corresponding number of apertures formed in the fin and engaged with the wire of the containment structure.

18. The lobster trap stabilization system of claim 12 comprising four stabilizing components.

19. The lobster trap stabilization system of claim 12 wherein the slanted wall of the containment structure of each of the one or more stabilizing components is attached to the lobster trap by aluminum clips.

20. The lobster trap stabilization system of claim 1 wherein each of the one or more stabilizing components is attached to the lobster trap by aluminum clips.

* * * * *